United States Patent
Zhang et al.

(10) Patent No.: US 10,891,473 B2
(45) Date of Patent: Jan. 12, 2021

(54) METHOD AND DEVICE FOR USE IN HAND GESTURE RECOGNITION

(71) Applicant: ArcSoft Corporation Limited, Hangzhou (CN)

(72) Inventors: Zhiwei Zhang, Hangzhou (CN); Chen Tang, Hangzhou (CN); Mingming Zhu, Hangzhou (CN); Ping Ye, Hangzhou (CN); Jin Wang, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 100 days.

(21) Appl. No.: 16/223,725

(22) Filed: Dec. 18, 2018

(65) Prior Publication Data

US 2019/0188460 A1    Jun. 20, 2019

(30) Foreign Application Priority Data

Dec. 18, 2017    (CN) .......................... 2017 1 1368652

(51) Int. Cl.
| | | |
|---|---|---|
| *G06K 9/00* | (2006.01) | |
| *G06T 7/50* | (2017.01) | |
| *G06T 7/70* | (2017.01) | |
| *G06F 3/01* | (2006.01) | |

(52) U.S. Cl.
CPC ......... *G06K 9/00355* (2013.01); *G06F 3/017* (2013.01); *G06K 9/00214* (2013.01); *G06K 9/00389* (2013.01); *G06T 7/50* (2017.01); *G06T 7/70* (2017.01); *G06T 2207/10028* (2013.01); *G06T 2207/20081* (2013.01); *G06T 2207/20084* (2013.01)

(58) Field of Classification Search
CPC ........... G06K 9/00355; G06K 9/00214; G06K 9/00389; G06T 7/50; G06T 7/70; G06F 3/017

See application file for complete search history.

(56) References Cited

U.S. PATENT DOCUMENTS

| | | | |
|---|---|---|---|
| 9,323,338 B2* | 4/2016 | He ......................... G06F 3/013 |
| 10,296,102 B1* | 5/2019 | Misra .................... G06K 9/2054 |
| 10,565,791 B2* | 2/2020 | Shen ........................ G06T 19/20 |
| 2010/0302247 A1* | 12/2010 | Perez .................. G06K 9/00335 |
| | | | 345/440 |
| 2016/0085310 A1* | 3/2016 | Shotton ................ G06K 9/6267 |
| | | | 382/103 |

(Continued)

*Primary Examiner* — Utpal D Shah
(74) *Attorney, Agent, or Firm* — Osha Bergman Watanabe & Burton LLP (57) ABSTRACT

A method and device for use in hand gesture recognition is applicable to image processing. The method includes: acquiring a depth map of a hand in a current image; estimating first positions of joints of the hand according to the depth map of the hand; creating a 3D point cloud of the hand according to the depth map of the hand; matching the first position of the joints of the hand and a stored 3D hand model to the 3D point cloud of the hand to obtain second positions of the joints and first degree of freedom parameters of the joints; and recognizing the hand's gestures according to the second positions of the joints and the first degree of freedom parameters of the joints. The method achieves a practical hand gesture recognition technique and recognizes hand gestures accurately.

11 Claims, 5 Drawing Sheets

(56) References Cited

U.S. PATENT DOCUMENTS

| | | | |
|---|---|---|---|
| 2017/0068849 A1* | 3/2017 | Lim | G06K 9/6202 |
| 2017/0168586 A1* | 6/2017 | Sinha | G06N 20/00 |
| 2018/0024641 A1* | 1/2018 | Mao | G06K 9/00389 |
| | | | 382/103 |
| 2019/0180473 A1* | 6/2019 | Guleryuz | G06K 9/6255 |
| 2019/0302895 A1* | 10/2019 | Jiang | G06F 3/016 |

* cited by examiner

METHOD AND DEVICE FOR USE IN HAND GESTURE RECOGNITION

CROSS-REFERENCE TO RELATED APPLICATIONS

This application claims priority to Chinese Patent Application No. 201711368652.0, filed on Dec. 18, 2017, which is hereby incorporated by reference in its entirety.

BACKGROUND OF THE INVENTION

Field of the Invention

The present disclosure relates to methods and devices for use in image processing and, more particularly, to a method and device for use in hand gesture recognition.

Description of the Prior Art

From the perspective of methods of collecting input data, hand gesture recognition technology falls within the following categories: one based on data gloves, one based on vision, and one based on sound waves. The vision-based one is leading in the field of hand gesture recognition technology but lacks any practical hand gesture recognition method.

SUMMARY OF THE INVENTION

A method and device for use in hand gesture recognition, provided by the present disclosure, overcome a drawback of the prior art, that is, the prior art lacks any practical hand gesture recognition method.

The first aspect of the present disclosure provides a method for use in hand gesture recognition, the method including the steps of: acquiring a depth map of a hand in a current image; estimating first positions of joints of the hand according to the depth map of the hand; creating a 3D point cloud of the hand according the depth map of the hand, matching the estimated first positions of the joints and a stored hand 3D model to the 3D point cloud of the hand to obtain second positions of the joints and first degree of freedom parameters of the joints; and recognizing the hand's gestures according to the second positions of the joints and the first degree of freedom parameters of the joint.

According to the first aspect of the present disclosure, in the first practicable manner of the first aspect of the present disclosure, the step of estimating first position of the joints of the hand according to the depth map of the hand includes: inputting the depth map of the hand to a trained image-hand gesture mapper to obtain the first positions of the joints, wherein the image-hand gesture mapper includes a mapping relation between hand gestures and hand depth maps obtained by hand depth map sample training, each hand gesture including at least one parameter, namely joint positions and joint degree of freedom parameters.

According to the first practicable manner of the first aspect of the present disclosure, in the second practicable manner of the first aspect of the present disclosure, the method includes, before the step of matching the estimated first positions of the joints and a stored 3D hand model to the 3D point cloud of the hand to obtain second position of the joints and first degree of freedom parameters of the joints, the steps of: inputting the depth map of the hand to the image-hand gesture mapper to obtain the second degree of freedom parameters of the joints; and matching the second degree of freedom parameters of the joints and the stored 3D hand model to the 3D point cloud of the hand to obtain first shape parameters of the hand, followed by updating the image-hand gesture mapper and the stored hand's 3D model according to the first shape parameters of the hand, wherein the step of inputting the depth map of the hand to a trained image-hand gesture mapper to obtain the first positions of the joints includes inputting the depth map of the hand to the updated image-hand gesture mapper to obtain the first positions of the joints, wherein the step of matching the estimated first positions of the joints and the stored 3D hand model to the 3D point cloud of the hand to obtain second positions of the joints and first degree of freedom parameters of the joints includes matching the estimated first positions of the joints and the updated 3D hand model to the 3D point cloud of the hand to obtain the second positions of the joints and the first degree of freedom parameters of the joints.

According to the second practicable manner of the first aspect of the present disclosure, in the third practicable manner of the first aspect of the present disclosure, the step of inputting the depth map of the hand to the image-hand gesture mapper to obtain the second degree of freedom parameters of the joints includes inputting the depth map of the hand in a first frame to the image-hand gesture mapper to obtain the second degree of freedom parameters of the joints, wherein, after the step of matching the second degree of freedom parameters of the joints and the stored 3D hand model to the 3D point cloud of the hand to obtain first shape parameters of the hand and then updating the image-hand gesture mapper and the stored hand's 3D model according to the first shape parameter of the hand, the method further includes: inputting the depth map of the hand in a second frame to the updated image-hand gesture mapper to obtain third degree of freedom parameters of the joints; creating a new 3D point cloud of the hand according to the depth map of the hand in the second frame, matching the third degree of freedom parameters of the joints and the updated 3D model to the new 3D point cloud of the hand to obtain second shape parameters of the hand, followed by updating the image-hand gesture mapper and the stored 3D hand model again according to the second shape parameters of the hand.

According to any one of the first through third practicable manners of the first aspect of the present disclosure, in the fourth practicable manner of the first aspect of the present disclosure, the image-hand gesture mapper includes a neural network or a random forest classifier.

According to the second or third practicable manner of the first aspect of the present disclosure, in the fifth practicable manner of the first aspect of the present disclosure, the shape parameters include at least one of lengths of hand bones and widths of the hand bones.

The second aspect of the present disclosure provides a device for use in hand gesture recognition, the device including: an acquisition module for acquiring a depth map of a hand in a current image; a pose estimation module for estimating first positions of joints of the hand according to the depth map of the hand, creating a 3D point cloud of the hand according to the depth map of the hand, and matching the estimated first positions of the hand and a stored 3D hand model to the 3D point cloud of the hand to obtain second positions of the joints and first degree of freedom parameters of the joints; and a gesture recognition module for recognizing the hand's gestures according to the second positions of the joints and the first degree of freedom parameters of the joints.

According to the second aspect of the present disclosure, in the first practicable manner of the second aspect of the present disclosure, the pose estimation module inputs the depth map of the hand to a trained image-hand gesture mapper to obtain the first positions of the joints, and the image-hand gesture mapper includes a mapping relation between hand gestures and hand depth maps obtained by hand depth map sample training, each of the hand gestures including at least one parameter, namely joint positions and joint degree of freedom parameters.

According to the first practicable manner of the second aspect of the present disclosure, in the second practicable manner of the second aspect of the present disclosure, the device further includes an updating module, wherein the pose estimation module inputs the depth map of the hand to the image-hand gesture mapper to obtain second degree of freedom parameters of the joints, whereas the updating module matches the second degree of freedom parameters of the joints and the stored 3D hand model to the 3D point cloud of the hand to obtain first shape parameters of the hand and updates the image-hand gesture mapper and the stored 3D hand model according to the first shape parameters of the hand, such that the pose estimation module inputs the depth map of the hand to the updated image-hand gesture mapper to obtain the first positions of the joints and matches the estimated first positions of the joints and the updated 3D hand model to the 3D point cloud of the hand to obtain the second positions of the joints and the first degree of freedom parameters of the joints.

According to the second practicable manner of the second aspect of the present disclosure, in the third practicable manner of the second aspect of the present disclosure, the pose estimation module inputs the depth map of the hand in a first frame to the image-hand gesture mapper to obtain second degree of freedom parameters of the joints, inputs the depth map of the hand in a second frame to the updated image-hand gesture mapper to obtain third degree of freedom parameters of the joints, creates a new 3D point cloud of the hand according to the depth map of the hand, matches the third degree of freedom parameters of the joints and the updated 3D hand model to the new 3D point cloud of the hand to obtain second shape parameters of the hand, and updates the image-hand gesture mapper and the stored 3D hand model again according to the second shape parameters of the hand.

According to any one of the first through third practicable manners of the second aspect of the present disclosure, in the fourth practicable manner of the second aspect of the present disclosure, the image-hand gesture mapper includes a neural network or a random forest classifier.

According to the second or third practicable manner of the second aspect of the present disclosure, in the fifth practicable manner of the second aspect of the present disclosure, the shape parameters includes at least one of lengths of hand bones and widths of the hand bones.

The third aspect of the present disclosure provides a computer-readable storage medium. The computer-readable storage medium stores a computer program. The steps of the method in any one of the first through fifth practicable manners of the first aspect of the present disclosure, according to the first aspect of the present disclosure, are implemented upon execution of the computer program by a processor.

The fourth aspect of the present disclosure provides a device for use in hand gesture recognition, including a memory, a processor and a computer program stored in the memory and executable by the processor. The steps of the method in any one of the first through fifth practicable manners of the first aspect of the present disclosure, according to the first aspect of the present disclosure, are implemented upon execution of the computer program by a processor.

The present disclosure provides a method and device for use in hand gesture recognition to achieve a practical hand gesture recognition technique and recognize hand gestures accurately.

DETAILED DESCRIPTION OF THE EMBODIMENTS

The embodiments of the present disclosure are illustrated by the accompanying drawings and described below.

Terms, such as "first" and "second", used herein and the accompanying drawings are intended for differentiations rather than specific sequences.

The wording "and/or" used in the embodiments of the present disclosure is descriptive of correlations and, more particularly, three correlations. For example, "A and/or B" defines three situations: "A", "A and B", and "B".

In the embodiments of the present disclosure, terms "illustrate", "illustrative" and "example" serve exemplary, evidential or explanatory purposes. No embodiment or solution provided in the present disclosure and described with the terms "illustrate", "illustrative" or "example" may be interpreted as being more preferable or advantageous than any other embodiments or solutions provided in the present disclosure. Specifically speaking, the terms "illustrate", "illustrative" and "example" are intended to present related concepts concretely.

For the sake of conciseness and clarity, the accompanying drawings are not necessarily drawn to scale. For example, for the sake of clarity, as shown in the accompanying drawings, some components are enlarged, but their counterparts are not. Furthermore, identical reference numerals may be used in the accompanying drawings repeatedly, as appropriate, to denote corresponding or similar components.

Figure 1:
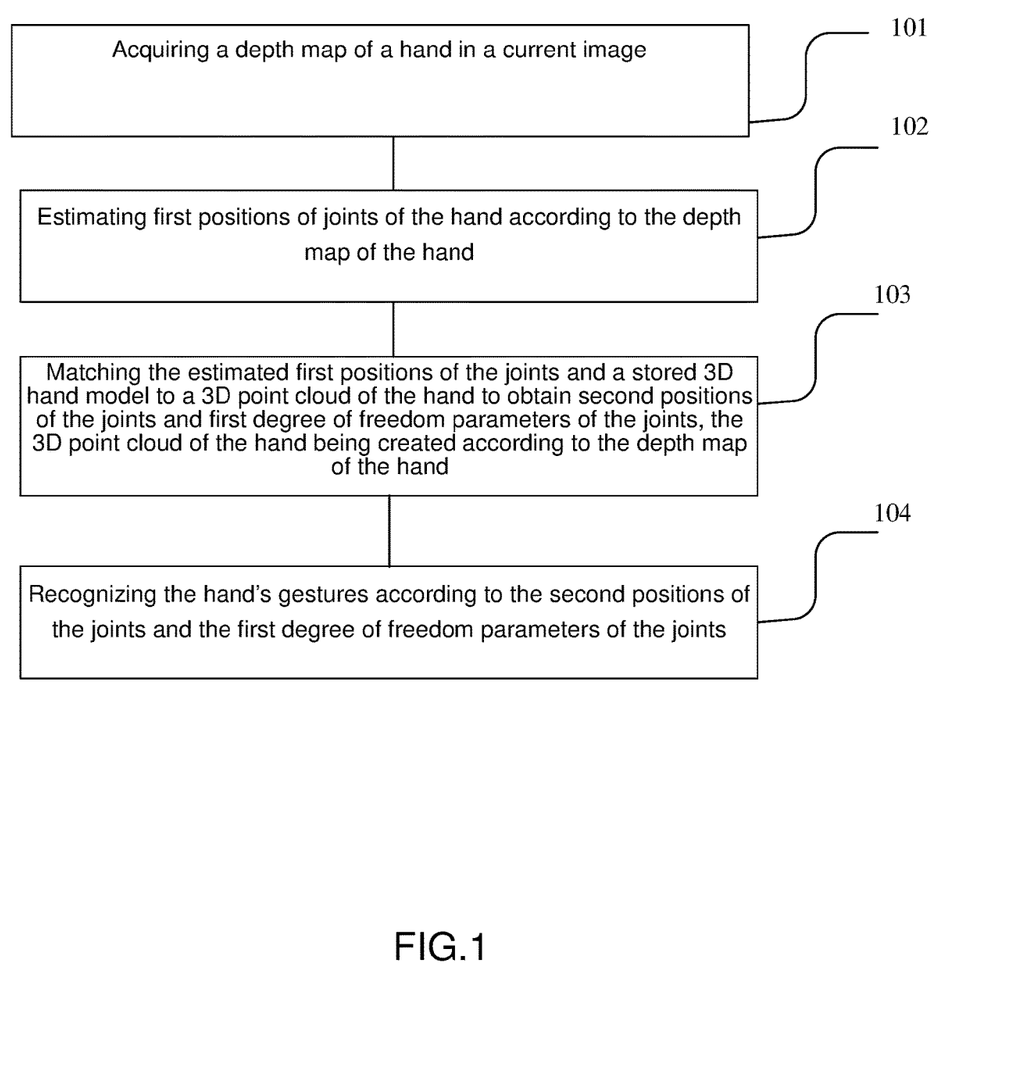
FIG. 1 is a flow chart of a method for use in hand gesture recognition according to an embodiment of the present disclosure.

A method for use in hand gesture recognition according to the first embodiment of the present disclosure is depicted with FIG. 1 and described below. As shown in FIG. 1, the method includes steps described below.

Step 101: acquiring a depth map of a hand in a current image.

The depth map of the hand in the current image is received from an image pickup device or a memory device. The memory device is a random-access memory (RAM), flash memory, or read-only memory (ROM).

The above-described depth map of the hand is acquired by cutting an image area containing the hand, i.e., region of interest (ROI), from an original complete depth map and then scaling it appropriately.

Optionally, before step 101, it is possible to detect the hand from the depth map in a depth video stream, i.e., a multi-frame depth map. A hand classifier is trained beforehand. The classifier and a depth threshold are used to detect and locate the hand in the depth map. Upon detecting the hand, coordinates of the center of the hand is outputted. On this basis, it is also possible to extract fingertips and other hand shape features to verify and eliminate false detections. Afterward, the position of the hand can be tracked, and, according to the position of the hand in the previous frame or the position and speed of the hand in the previous frame, the position of the hand in the current frame can be predicted and coordinates of its center can be outputted. At the same time, a tracking confidence level can be outputted. When the tracking confidence level is low, the tracking is assumed to have failed, and the next frame undergoes the above-described detection. Optionally, motion prediction and a kernel correlation filter (KCF) tracking method can be used to track the hand in the depth video stream. When tracking the position of the hand, the above-mentioned image area including the hand can be cut out from the depth map. Since the depth map has a one-to-one correspondence with a color image or a black-and-white image, the above-described detection and tracking steps can also process a normal color image or a black-and-white image to achieve the above objective.

Step 102: estimating first (initial) positions of joints of the hand from the depth map of the hand.

Figure 2:
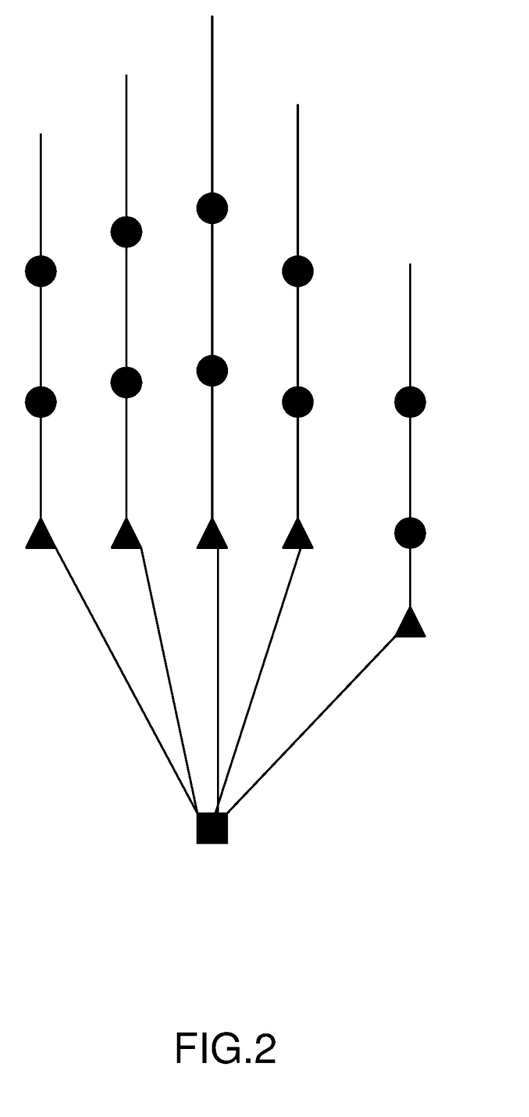
FIG. 2 is a schematic view of a hand's bone model according to the first embodiment of the present disclosure.

The step of estimating the first (initial) positions of the joints of the hand from the depth map of the hand includes inputting the depth map of the hand to a trained image-hand gesture mapper to obtain the first positions of the joints. The image-hand gesture mapper includes a mapping relation between hand depth maps and hand gestures obtained from sample training with the hand depth maps where each of the hand gestures includes at least one of the following parameters: positions of joints of a hand and degree of freedom parameters of the joints of the hand. The positions of the joints described above may include three-dimensional coordinates of the joints. A degree of freedom parameter is the different directions by which a bone of the hand rotates about a joint. As shown in FIG. 2, a joint has six degrees of freedom is denoted by a rectangle, two degrees of freedom is denoted by a triangle, and one degree of freedom is denoted by a circle.

The image-hand gesture mapper may be a neural network or a random forest classifier.

Take the neural network as an example, the neural network is a convolutional neural network. The input of the convolutional neural network may be a depth map of a hand. Optionally, the input of the convolutional neural network further includes shape parameters of the hand. The output of the convolutional neural network may include positions of joints of the hand. Optionally, the output of the convolutional neural network may further include the hand's gesture.

Step 103: matching the estimated first positions of the joints and a stored 3D hand model to a generated 3D point cloud of the hand to obtain second (refined) positions of the joints and first (initial) degree of freedom parameters of the joints. For example, the 3D hand model of the hand is optimized with the first (initial) positions of the joints to obtain an initial pose of the 3D hand model, which is then matched to the 3D point cloud of the hand to obtain a refined pose of the 3D model.

The described 3D point cloud of the hand is generated according to the depth map of the hand. Pixel points indicative of the hand are mapped to a 3D coordinate system of an image pickup device according to depth data in the depth map to form the 3D point cloud.

The stored 3D hand model may be a 3D model based on spherical mesh. The 3D hand model may be determined according to pose parameters (degree of freedom parameters of joints) and shape parameters.

Optionally, during the matching process, an optimization objective function is created by calculating differences between the 3D hand model and the 3D point cloud. The optimization objective function may further include an optimization target of at least one of preceding-subsequent frame parameter difference, range constraints on degree of freedom of the joints, and prior probability of the degree of freedom of the joints. Finally, the optimal degree of freedom parameters of the joints and the described positions of the joints can be calculated iteratively by Levenberg-Marquardt (LM) algorithm. The matching process may be performed on the points, in whole or in part.

Step 104: recognizing the hand's gesture according to the second position of the joints and the first degree of freedom parameters of the joints. Optionally, in this step, vector features of adjacent joints may be extracted according to the outputted first degree of freedom parameters of the joints and the second positions of the joints. The hand's gesture or motion may be recognized with a well-trained support vector machine (SVM), and a corresponding command may be issued.

The above recognized hand gesture may be a hand gesture recognized in one or more frames, or a dynamic hand gesture in consecutive frames.

Optionally, by default, the shape parameters in the image-hand gesture mapper and the stored 3D hand model are statistical averages obtained from a sample data set of hands so estimation accuracy varies when applied to different users. Hence, before carrying out the above matching process, the shape parameters in the image-hand gesture mapper and the 3D hand model may be optimized. The shape parameters include at least one of (1) lengths of hand bones and (2) widths of the hand bones. Hence, the 3D hand model and the image-hand gesture mapper can be matched to a shape parameters of a new user's hand to yield accurate gesture estimation results. Before matching the estimated first positions of the joints and the stored 3D hand model to the 3D point cloud of the hand to obtain the second positions of the joints and the first degree of freedom parameters of the joints, the method further includes: inputting the depth map of the hand to the image-hand gesture mapper to obtain second degree of freedom parameters of the joints, matching the second degree of freedom parameters of the joints and the stored 3D hand model to the 3D point cloud of the hand to obtain first shape parameters of the hand, and updating the image-hand gesture mapper and the stored 3D hand model according to the first shape parameters of the hand. The step of inputting the depth map of the hand to the trained image-hand gesture mapper to obtain the first positions of the joints includes: inputting the depth map of the hand to the updated image-hand gesture mapper to obtain the first positions of the joints. The step of matching the estimated first positions of the joints and the stored 3D hand model to the 3D point cloud of the hand to obtain the second positions of the joints and the first degree of freedom parameters of the joints includes: matching the estimated first positions of the joints and the updated the 3D hand model to the 3D point cloud of the hand to obtain the second positions of the joints and the first degree of freedom parameters of the joints.

Optionally, multiple frames in the depth video stream may be utilized to optimize the above-described shape parameters in the image-hand gesture mapper and the 3D hand model. The frames may be continuous or discrete frames. Therefore, the shape parameters may be optimized by separately capturing depth maps rather than collecting depth maps in a depth video stream. The step of inputting the depth map of the hand to the image-hand gesture mapper to obtain the second degree of freedom parameters of the joints includes: inputting a depth map of the hand in a first frame to the image-hand gesture mapper to obtain the second degree of freedom parameters of the joints. After the steps of matching the second degree of freedom parameters of the joints and the stored 3D hand model to the 3D point cloud of the hand to obtain the first shape parameters of the hand and updating the image-hand gesture mapper and the stored 3D hand model according to the first shape parameters of the hand, the method may further include: inputting a depth map of the hand in a second frame to the updated image-hand gesture mapper to obtain third degree of freedom parameters of the joints, creating a new 3D point cloud of the hand according to the depth map of the hand in the second frame, matching the third degree of freedom parameters of the joints and the updated 3D hand model to the new 3D point cloud of the hand to obtain second shape parameters of the hand, and updating the image-hand gesture mapper and the stored 3D hand model again with the second shape parameters of the hand.

The above-described updating step entails updating the shape parameters in the 3D hand model and the image-hand gesture mapper. In the course of optimization of the shape parameters, the initial input of the image-hand gesture mapper includes: using a statistical average obtained according to the sample data set of hands as an initial input of the shape parameters, wherein its output includes degree of freedom parameters of the joints. An initial input of the 3D hand model includes: using a statistical average obtained according to the sample data set of hands as an initial input of the shape parameters, and the degree of freedom parameters of the joints outputted from the image-hand gesture mapper as an initial input of pose parameters. Afterward, the 3D hand model is matched iteratively to the 3D point cloud created from the depth map of the hand with Levenberg-Marquardt optimization algorithm to thereby calculate variations of the shape parameters and variations of the pose parameters. Optionally, a regularizer is introduced in the course of optimization to ensure that the variations of the pose parameters are less than a specific threshold. The shape parameters in the image-hand gesture mapper and the 3D hand model are updated according to the variations of the shape parameters. Afterward, the depth map of the hand in another frame (i.e., the second frame mentioned before) is acquired to create a corresponding 3D point cloud. At the same time, the depth map of the hand in the other frame is inputted into the image-hand gesture mapper with the updated shape parameters to output new degree of freedom parameters of the joints. The new degrees of freedom parameters of the joints are inputted into the 3D model with the updated shape parameters, which is matched to the new 3D point cloud of the hand. The new 3D point cloud of the hand is created according to the depth map of the hand in the other frame to obtain the variations of the new shape parameters. According to the variations of the new shape parameters, the newest shape parameters are obtained and referred to as second shape parameters. The shape parameters in the image-hand gesture mapper and the stored 3D hand model are updated again according to the second shape parameters. Hence, the shape parameters in the image-hand gesture mapper and 3D model is optimized repeatedly according to the input of the depth maps in different frames until variations of the shape parameter are less than or equal to a specific threshold, at which point the optimization of the shape parameter ends.

The first degree of freedom parameters, second degree of freedom parameters, and third degree of freedom parameters are degree of freedom parameters of joints. The first shape parameter and the second shape parameter are shape parameters.

Upon completion of the shape parameter optimization, estimation of hand's gesture begins by following the steps as follows:

1. Use the image-hand gesture mapper, which has undergone shape parameters optimization, to perform rough estimation of positions of the joints on the current frame. Optionally, estimation of the degree of freedom parameters of the joints is performed, and then an estimated confidence level is outputted. If the confidence level is higher than a specific threshold, the next frame will go to step 2, otherwise go to the step of detecting the presence of the hand in the depth map.

2. The method, whereby the 3D hand model, which has undergone shape parameters optimization, is matched to the 3D point cloud created from the depth map, is used to perform fine estimation of the degree of freedom parameters of the joints and fine estimation of positions of the joints, and then a confidence level is outputted. If the confidence level is higher than a specific threshold, the degree of freedom parameters and the position parameters of the joints will be outputted for use in the step of hand gesture recognition, and the next frame will go to step 2, otherwise the next frame will go to step 1.

The step of hand gesture recognition entails creating, beforehand, the degree of freedom parameters of the joints, the position parameters of the joints, and a mapper of a mapping relation with definitions for hand gestures. The definitions for hand gestures are classifications of hand gesture definitions or specific motions directly corresponding to the degree of freedom parameters and the position parameters of the joints, such as zooming in and unlocking screen. The definitions for hand gestures in a video stream or images are recognized with the mapper and recognized according to the degree of freedom parameters and the position parameters of the joints estimated by the method.

A method for use in hand gesture recognition according to the present disclosure achieves a practical hand gesture recognition technique and recognizes hand gestures accurately. A hand's shape parameters are optimized before recognition, and thus the recognition process is robust. The method of the present disclosure is simple and has lenient requirements for the frame rate of an image pickup device.

Figure 3:
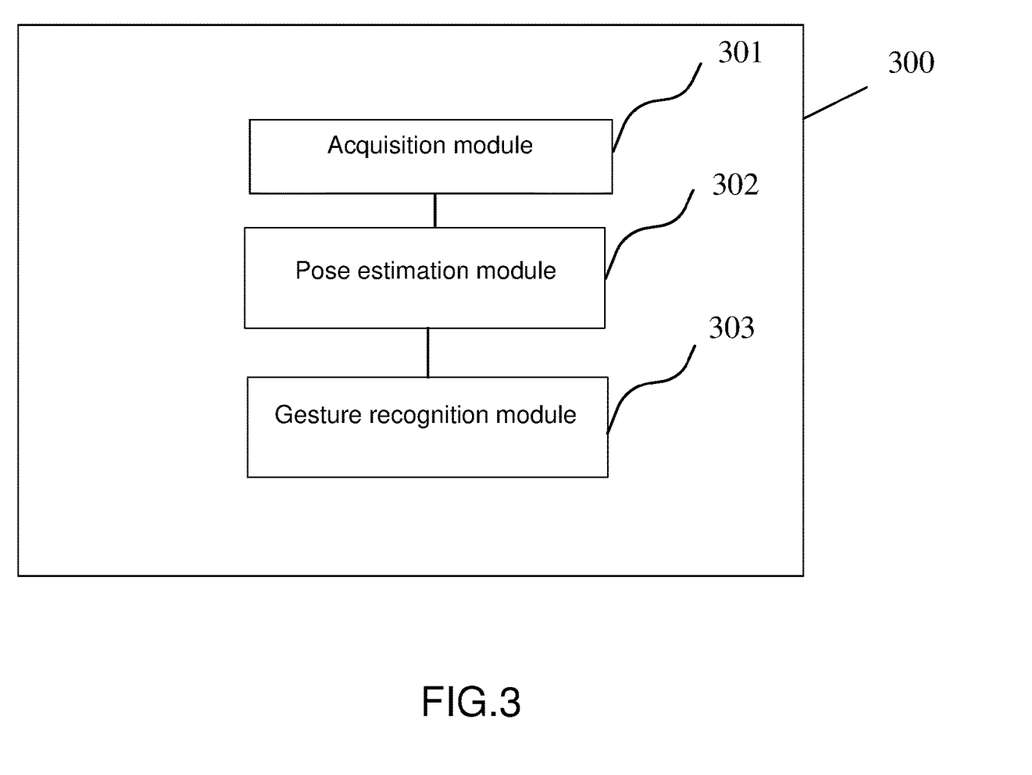
FIG. 3 is a schematic view of a device for use in hand gesture recognition according to the second embodiment of the present disclosure.

A device 300 for use in hand gesture recognition according to the second embodiment of the present disclosure is depicted with FIG. 3 and described below. As shown in FIG. 3, the device 300 includes an acquisition module 301, a pose estimation module 302 and a gesture recognition module 303.

The acquisition module 301 is for acquiring a depth map of a hand in a current image.

The depth map of the hand in the current image is retrieved from an image pickup device or a memory device. The memory device is a random-access memory (RAM), flash memory or read-only memory (ROM).

The depth map of the hand is retrieved by cutting an image area containing the hand i.e., region of interest (ROI), from an original complete depth map and then scaling it appropriately.

Optionally, the device further includes a detection module. The detection module detects the hand from the depth map in a depth video stream, i.e., a multi-frame depth map. A hand classifier is trained beforehand. The classifier and a depth threshold are used to detect and locate the hand in the depth map. Upon detecting the hand, coordinates of the center of the hand is outputted. On this basis, it is also possible to extract fingertips and other hand shape features to verify and eliminate false detections. Afterward, the position of the hand can be tracked, and, according to the position of the hand in the previous frame or the position and speed of the hand in the previous frame, the position of the hand in the current frame can be predicted and coordinates of its center can be outputted. At the same time, a tracking confidence level can be outputted. When the tracking confidence level is low, the tracking is assumed to have failed, and the next frame undergoes the above-described detection. Optionally, motion prediction and a kernel correlation filter (KCF) tracking method can be used to track the hand in the depth video stream. When tracking the position of the hand, the above-mentioned image area including the hand can be cut out from the depth map. Since the depth map has a one-to-one correspondence with a color image or a black-and-white image, the above-described detection and tracking steps can also process a normal color image or a black-and-white image to achieve the above objective.

The pose estimation module 302 estimates first (initial) positions of joints of the hands according to the depth map of the hand.

The pose estimation module 302 inputs the depth map of the hand to a trained image-hand gesture mapper to obtain the first positions of the joints. The image-hand gesture mapper includes a mapping relation between hand depth maps and hand gestures obtained from sample training with the hand depth maps where each of the hand gestures includes at least one of the following parameters: positions of joints of a hand and degree of freedom parameters of the joints of the hand. The positions of the joints described above may include three-dimensional coordinates of the joints. A degree of freedom parameter is the different directions by which a bone of the hand rotates about a joint. As shown in FIG. 2, a joint has six degrees of freedom is denoted by a rectangle, two degrees of freedom is denoted by a triangle, and one degree of freedom is denoted by a circle.

The image-hand gesture mapper includes a neural network or a random forest classifier.

Take the neural network as an example, the neural network is a convolutional neural network. The input of the convolutional neural network may be a depth map of a hand. Optionally, the input of the convolutional neural network further includes shape parameters of the hand. The output of the convolutional neural network may include positions of joints of the hand. Optionally, the output of the convolutional neural network may further include the hand's gesture.

The pose estimation module 302 matches the estimated first positions of the joints and a stored 3D hand model to a generated 3D point cloud of the hand to obtain second (refined) positions of the joints and first (initial) degree of freedom parameters of the joints.

The pose estimation module 302 generates the described 3D point cloud of the hand according to the depth map of the hand. Pixel points indicative of the hand are mapped to a 3D coordinate system of an image pickup device according to depth data in the depth map to form the 3D point cloud.

The stored 3D hand model includes a 3D model based on spherical mesh. The 3D hand model may be determined according to pose parameters (degree of freedom parameters of joints) and shape parameters.

Optionally, during the matching process, an optimization objective function is created by calculating differences between the 3D hand model and the 3D point cloud. The optimization objective function may further include an optimization target of at least one of preceding-subsequent frame parameter difference, range constraints on degree of freedom of the joints, and prior probability of the degree of freedom of the joints. Finally, the optimal degree of freedom parameters of the joints and the described positions of the joints can be calculated iteratively by Levenberg-Marquardt (LM) algorithm. The matching process may be performed on the points, in whole or in part.

The gesture recognition module 303 recognizes the hand's gesture according to the second position of the joints and the first degree of freedom parameters of the joints. Optionally, the vector features of adjacent joints may be extracted according to the outputted first degree of freedom parameters of the joints and the positions of the joints, and the specific gesture or action is recognized by a trained support vector machine, and a corresponding command is issued.

The above-described hand gesture may be a hand gesture recognized in one or more frames, or a dynamic hand gesture in consecutive frames.

Optionally, by default, the shape parameters in the image-hand gesture mapper and the stored 3D hand model are statistical averages obtained according to sample data set of hands so estimation accuracy varies when applied to different users. Hence, before carrying out the above-described matching process, the shape parameters in the image-hand gesture mapper and the 3D hand model may be optimized. The shape parameters include at least one of (1) lengths of hand bones and (2) widths of the hand bones. Hence, the 3D hand model and the image-hand gesture mapper can be matched to shape parameters of a new user's hand to yield accurate gesture estimation results. Hence, the device further includes an updating module, wherein the pose estimation module inputs the depth map of the hand to the image-hand gesture mapper to obtain second degree of freedom parameters of the joints, whereas the updating module matches the second degree of freedom parameters of the joints and the stored 3D hand model to the 3D point cloud of the hand to obtain first shape parameters of the hand and updates the image-hand gesture mapper and the stored 3D hand model according to the first shape parameters of the hand, such that the pose estimation module inputs the depth map of the hand to the updated image-hand gesture mapper to obtain the first positions of the joints and matches the estimated first positions of the joints and the updated 3D hand model to the 3D point cloud of the hand to obtain the second positions of the joints and the first degree of freedom parameters of the joints.

Optionally, multiple frames in the depth video stream may be utilized to optimize the above-described shape parameters in the image-hand gesture mapper and the 3D hand model. The frames are continuous or discrete; hence, the shape parameters may be optimized by separately capturing depth maps rather than collecting depth maps in a depth video stream. The pose estimation module inputs a depth map of the hand in a first frame to the image-hand gesture mapper to obtain second degree of freedom parameters of the joints, inputs a depth map of the hand in a second frame to the updated image-hand gesture mapper to obtain third degree of freedom parameters of the joints, creates a new 3D point cloud of the hand according to the depth map of the hand in the second frame, matches the third degree of freedom parameters of the joints and the updated 3D hand model to the new 3D point cloud of the hand to obtain second shape parameters of the hand, and updates the image-hand gesture mapper and the stored 3D hand model again with the second shape parameters of the hand.

The above-described updating step entails updating the shape parameters in the image-hand gesture mapper and the 3D model. In the course of optimization of the shape parameters, the initial input of the image-hand gesture mapper includes: using a statistical average obtained according to the sample data set of hands as an initial input of the shape parameters, wherein its output includes the degree of freedom parameters of the joints. An initial input of the 3D hand model includes: using a statistical average obtained according to the sample data set of hands as an initial input of the shape parameters, and the degree of freedom parameters of the joints output from the image-hand gesture mapper as an initial input of pose parameters. Afterward, the 3D hand model is matched iteratively to the 3D point cloud created from the depth map of the hand with Levenberg-Marquardt optimization algorithm to thereby calculate variations of the shape parameters and variations of the pose parameters. Optionally, a regularizer is introduced in the course of optimization to ensure that the variations of the pose parameters are less than a specific threshold. The shape parameters in the image-hand gesture mapper and the 3D hand model are updated according to the variations of the shape parameters. Afterward, the depth map of the hand in another frame (i.e., the second frame mentioned before) is acquired to create a corresponding 3D point cloud. At the same time, the depth map of the hand in the other frame is inputted into the image-hand gesture mapper with the updated shape parameters to output new degree of freedom parameters of the joints. The new degrees of freedom parameters of the joints are inputted into the 3D model with the updated shape parameters, which is matched to the new 3D point cloud of the hand. The new 3D point cloud of the hand is created according to the depth map of the hand in the other frame to obtain the variations of the new shape parameters. According to the variations of the new shape parameters, the newest shape parameters are obtained and referred to as second shape parameters. The shape parameters in the image-hand gesture mapper and the stored 3D hand model are updated again according to the second shape parameters. Hence, the shape parameters in the image-hand gesture mapper and 3D model is optimized repeatedly according to the input of the depth maps in different frames until variations of the shape parameter are less than or equal to a specific threshold, at which point the optimization of the shape parameter ends.

The first degree of freedom parameters, second degree of freedom parameters, and third degree of freedom parameters are degree of freedom parameters of the joints. The first shape parameter and the second shape parameter are shape parameters.

Upon completion of the shape parameter optimization performed with the pose estimation module, estimation of the hand's gesture is performed with the pose estimation module by following the steps as follows:

1. Use the image-hand gesture mapper, which has undergone shape parameters optimization, to perform rough estimation of positions of the joints on the current frame. Optionally, estimation of the degree of freedom parameters of the joints is performed, and then an estimated confidence level is outputted. If the confidence level is higher than a specific threshold, the next frame will go to step 2, otherwise go to the step of detecting the presence of the hand in the depth map.

2. The method, whereby the 3D hand model, which has undergone shape parameters optimization, is matched to the 3D point cloud created from the depth map, is used to perform fine estimation of the degree of freedom parameters of the joints and fine estimation of positions of the joints, and then a confidence level is outputted. If the confidence level is higher than a specific threshold, the degree of freedom parameters and the position parameters of the joints will be outputted for use in the step of hand gesture recognition, and the next frame will go to step 2, otherwise the next frame will go to step 1.

The gesture recognition module creates, beforehand, the degree of freedom parameters of the joints, the position parameters of the joints, and a mapper of a mapping relation with definitions for hand gestures. The definitions for hand gestures are classifications of hand gesture definitions or specific motions directly corresponding to the degree of freedom parameters and the position parameters of the joints, such as zooming in and unlocking screen. The definitions for hand gestures in a video stream or images are recognized with the mapper and recognized according to the degree of freedom parameters and the position parameters estimated by the method.

The present disclosure provides a device for use in hand gesture recognition to achieve a practical hand gesture recognition technique and recognize hand gestures accurately. The hand's shape parameter is optimized before recognition, and thus the recognition process is robust. The method of the present disclosure is simple and has lenient requirements for the frame rate of an image pickup device.

Figure 4:
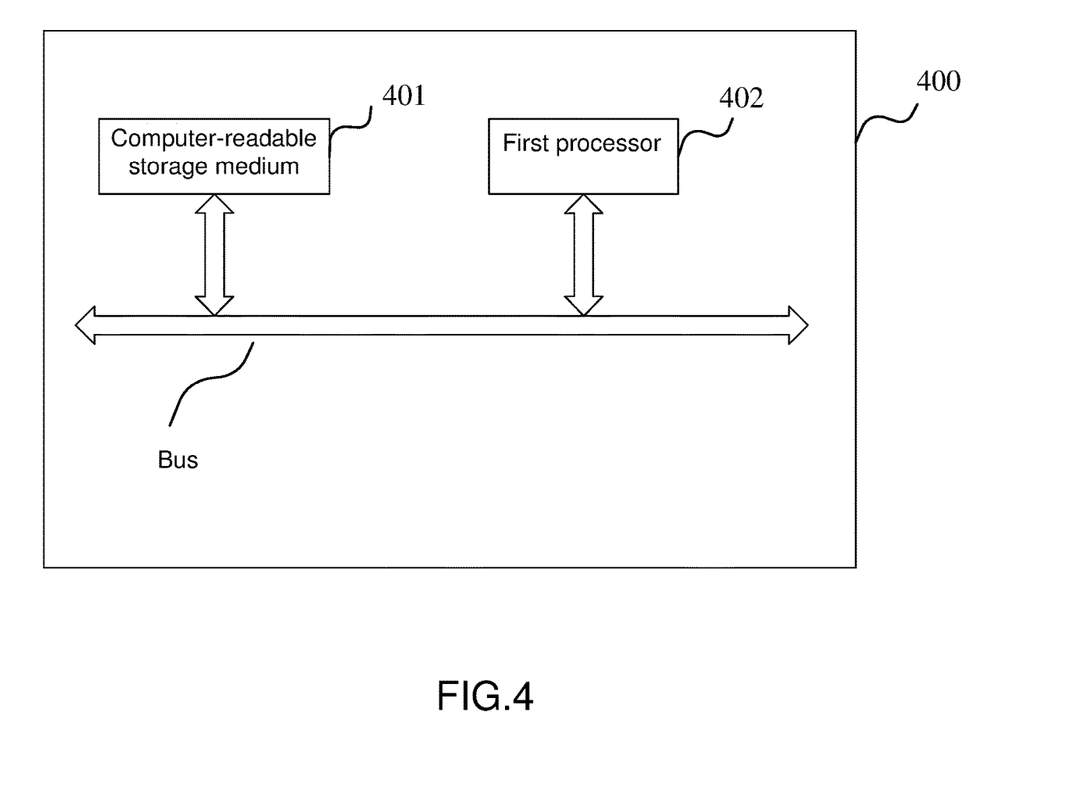
FIG. 4 is a schematic view of a device for use in hand gesture recognition according to the third embodiment of the present disclosure.

A device 400 provided in the third embodiment of the present disclosure and adapted for use in hand gesture recognition is depicted with FIG. 4 and described below. The device 400 includes a computer-readable storage medium 401. The computer-readable storage medium 401 stores a computer program. The computer program implements the steps of the method in the first embodiment when executed by a processor 402. As shown in FIG. 4, optionally, the device 400 includes a bus.

Functions of components in this embodiment are identical to those in the first or second embodiment.

The device provided by the present disclosure and adapted for use in hand gesture recognition achieves a practical hand gesture recognition technique and recognizes hand gestures accurately. The hand's shape parameter is optimized before recognition, and thus the recognition process is robust. The method of the present disclosure is simple and has lenient requirements for the frame rate of an image pickup device.

Figure 5:
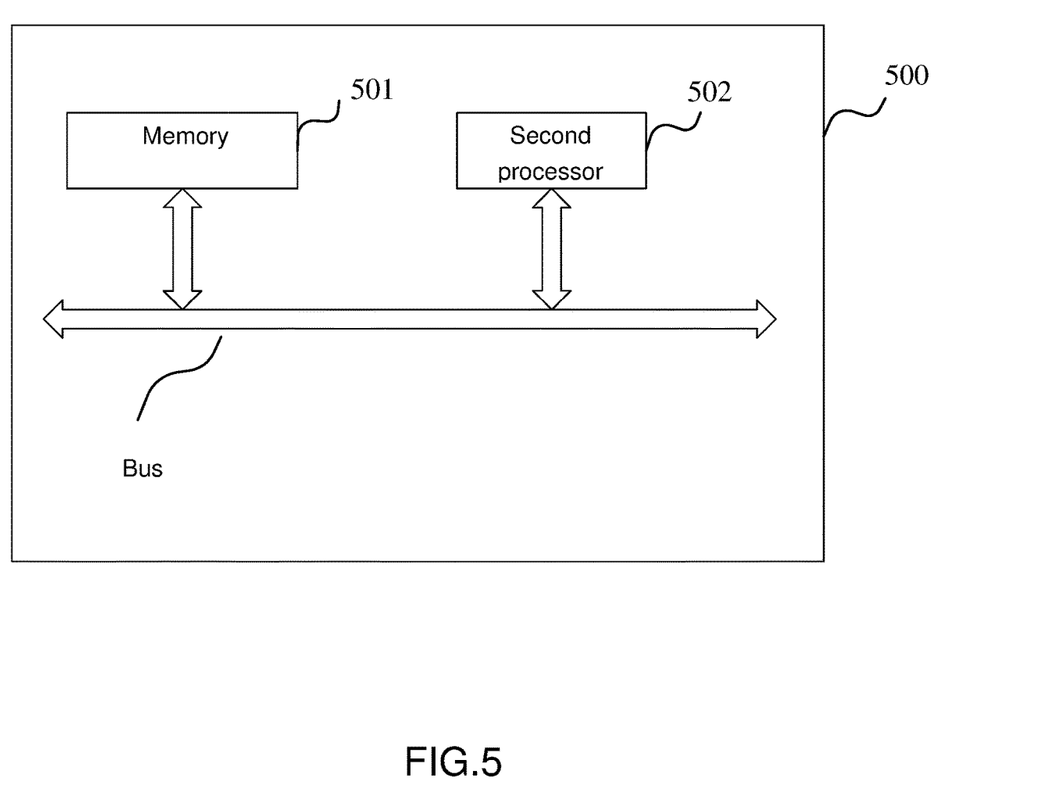
FIG. 5 is a schematic view of a device for use in hand gesture recognition according to the fourth embodiment of the present disclosure.

A device 500 provided in the fourth embodiment of the present disclosure and adapted for use in hand gesture recognition is depicted with FIG. 5 and described below. The device 500 includes a memory 501, a processor 502 and a computer program stored in the memory 501 and executable by the processor 502. The computer program implements the steps of the method in the first embodiment when executed by the processor 502. Optionally, as shown in FIG. 5, the device 500 further includes a bus.

A device for use in hand gesture recognition according to the present disclosure achieves a practical hand gesture recognition technique and recognizes hand gestures accurately. The hand's shape parameter is optimized before recognition, and thus the recognition process is robust. The method of the present disclosure is simple and has lenient requirements for the frame rate of an image pickup device.

For illustrative purposes, the computer program is divided into one or more modules/units. The one or more modules/units are stored in the memory and executed with the processor to implement the present disclosure. The one or more modules/units are a series of computer program command segments capable of accomplishing specific functions. The command segments are descriptive of the course of execution of the computer program in the device/terminal equipment.

The device/terminal equipment is a computation apparatus, such as cellular phone, tablet, desktop, notebook, palmheld computer and cloud server. The device/terminal equipment includes, but is not limited to, a processor and a memory. Persons skilled in the art understand that the accompanying drawings of the present disclosure are illustrative of the device/terminal equipment rather than restrictive of the device/terminal equipment; hence, the device/terminal equipment includes more components, combinations of specific components, or different components than are shown, or includes less components, combinations of specific components, or different components than are shown. For example, the device/terminal equipment further includes an input/output apparatus, network access apparatus, and a bus.

The processor is a central processing unit (CPU), a general-purpose processor, a digital signal processor (DSP), an application specific integrated circuit (ASIC), a field-programmable gate array (FPGA), a programmable logic device, discrete gates, a transistor logic device, and discrete hardware components. The general-purpose processor is a microprocessor or any conventional processor. The processor is the control center of the device/terminal equipment. All parts of the device/terminal equipment are connected by various interfaces and wirings.

The memory stores the computer program and/or module. The processor implements various functions of the device/terminal equipment by operating or executing computer program and/or module stored in the memory and accessing data stored in memory. The memory includes a program storage region and a data storage region. The program storage region stores an operating system and application required for at least one function (for example, an image-playing function). The data storage region stores data (for example, video data and images) created according to the usage of a cellular phone. Furthermore, the memory includes high-speed random-access memory and further includes non-volatile memory, for example, hard disk drive, random-access memory (RAM), external hard disk drive, smart media card (SMC), secure digital (SD) card, flash card, at least one magnetic disk storage, flash memory device, or another volatile solid-state memory device.

The device/terminal equipment integrated module/unit is stored in a computer-readable storage medium, so as to be implemented in the form of a software function unit and sold or used as a self-contained product. Therefore, the process flow of the method in the aforesaid embodiment of the present disclosure is implemented, in whole or in part, by related hardware under the instruction of the computer program. The computer program is stored in a computer-readable storage medium and implements the aforesaid steps of the method in the aforesaid embodiment when executed by the processor. The computer program includes computer program code. The computer program code is in source code form, object code form, executable file or specific intermediate form. The computer-readable storage medium includes: any device or entity carrying the computer program code, recording medium, USB flash drive, external hard disk drive, disk, compact disc, computer memory, read-only memory (ROM), random-access memory (RAM), electrical carrier signals, telecommunication signals and software distribution medium.

In the aforesaid embodiments, the imaging of a target object is either the partial imaging of the target object or the total imaging of the target object. Both the partial imaging and the total imaging are adjusted and then applied to the method or device provided by the present disclosure. The aforesaid adjustment can be devised by persons skilled in the art without making any creative effect and thus falls within the scope of the claims of the present disclosure.

What is claimed is:

1. A method for use in hand gesture recognition, the method comprising the steps of:
acquiring a depth map of a hand in a current image;
estimating first positions of joints of the hand according to the depth map of the hand;
creating a 3D point cloud of the hand according to the depth map;
matching the first positions of the joints and a stored 3D hand model to the 3D point cloud of the hand to obtain second positions of the joints and first degree of freedom parameters of the joints; and
recognizing the hand's gesture according to the second positions of the joints and the first degree of freedom parameters of the joints,
wherein the step of estimating first positions of joints of the hand according to the depth map comprises: inputting the depth map of the hand to a trained image-hand gesture mapper to obtain the first positions of the joints, wherein the image-hand gesture mapper comprises a mapping relation between hand gestures and the hand depth maps obtained by hand depth map sample training, each of the hand gestures comprising at least one of joint positions and joint degree of freedom parameters.

2. The method of claim 1, before the step of matching the first position of the joints and a stored 3D hand model to the 3D point cloud of the hand to obtain second positions of the joints and first degree of freedom parameters of the joints, further comprising the steps of:
inputting the depth map of the hand to the image-hand gesture mapper to obtain second degree of freedom parameters of the joints; and
matching the second degree of freedom parameters and the stored 3D hand model to the 3D point cloud of the hand to obtain first shape parameters of the hand, followed by updating the image-hand gesture mapper and the stored 3D hand model according to the first shape parameters of the hand,
wherein the step of inputting the depth map to a trained image-hand gesture mapper to obtain the first positions of the joints comprises inputting the depth map of the hand to the updated image-hand gesture mapper to obtain the first position of the joints,
wherein the step of matching the first positions of the joints and the stored 3D hand model to the 3D point cloud of the hand to obtain second positions of the joints and first degree of freedom parameters of the joints comprises matching the first positions of the joints and the updated 3D hand model to the 3D point cloud of the hand to obtain the second positions of the joints and the first degree of freedom parameters of the joints.

3. The method of claim 2, wherein the step of inputting the depth map of the hand to the image-hand gesture mapper to obtain second degree of freedom parameters of the joints comprises inputting a first depth map of the hand in a first frame to the image-hand gesture mapper to obtain the second degree of freedom parameters of the joints, wherein, after the step of matching the second degree of freedom parameters of the joints and the stored 3D hand model to the 3D point cloud of the hand to obtain first shape parameters of the hand and then updating the image-hand gesture mapper and the stored 3D hand model according to the first shape parameters of the hand, the method further comprises:

inputting a second depth map of the hand in a second frame to the updated image-hand gesture mapper to obtain third degree of freedom parameters of the joint;

creating a new 3D point cloud of the hand according to the second depth map of the hand in the second frame; and matching the third degree of freedom parameters and the updated 3D hand model to the new 3D point cloud of the hand to obtain second shape parameters of the hand, followed by updating the image-hand gesture mapper and the stored 3D hand model again according to the second shape parameters of the hand.

4. The method of claim 1, wherein the image-hand gesture mapper comprises a neural network or a random forest classifier.

5. The method of claim 2, wherein the first shape parameters comprise at least one of lengths of hand bones and widths of the hand bones.

6. A device for use in hand gesture recognition, the device comprising:

a memory, a processor and a computer program stored in the memory and executable by the processor, wherein the processor is configured to:

acquire a depth map of a hand in a current image;

estimate first position of joints of the hand according to the depth map of the hand, create a 3D point cloud of the hand according to the depth map of the hand, and match the first position of the joints and a stored 3D hand model to the 3D point cloud of the hand to obtain second positions of the joints and first degree of freedom parameters of the joints;

recognize the hand's gesture according to the second position of the joints and the first degree of freedom parameters of the joints; and input the depth map of the hand to a trained image-hand gesture mapper to obtain the first positions of the joints, and wherein the image-hand gesture mapper comprises a mapping relation between hand gestures and hand depth maps obtained by depth map sample training, the hand gestures each comprising at least one of joint positions and joint degree of freedom parameters.

7. The device of claim 6, wherein the processor is further configured to:

input the depth map of the hand to the image-hand gesture mapper to obtain second degree of freedom parameters of the joints;

match the second degree of freedom parameters of the joints and the stored 3D hand model to the 3D point cloud of the hand to obtain first shape parameters of the hand;

update the image-hand gesture mapper and the stored 3D hand model according to the first shape parameters of the hand; and input the depth map of the hand to the updated image-hand gesture mapper to obtain the first positions of the joints and match the first positions of the joints and the updated 3D hand model to the 3D point cloud of the hand to obtain the second positions of the joints and the first degree of freedom parameters of the joints.

8. The device of claim 7, wherein the processor inputs a depth map of the hand in a first frame to the image-hand gesture mapper to obtain second degree of freedom parameters of the joints, inputs a second depth map of the hand in a second frame to the updated image-hand gesture mapper to obtain third degree of freedom parameters of the joints, creates a new 3D point cloud of the hand according to the second depth map of the hand in the second frame, matches the third degree of freedom parameters of the joints and the updated 3D model to the new 3D point cloud of the hand to obtain second shape parameters of the hand, and updates the image-hand gesture mapper and the stored 3D hand model again according to the second shape parameters of the hand.

9. The device of claim 6, wherein the image-hand gesture mapper comprises a neural network or a random forest classifier.

10. The device of claim 7, wherein the first shape parameters comprise at least one of lengths of hand bones and widths of the hand bones.

11. A computer-readable storage medium, the computer-readable storage medium storing a computer program for implementing the steps of the method of claim 1 when executed by a processor.

* * * * *